May 12, 1959 G. E. GLISS 2,885,777
METHODS OF AND APPARATUS FOR COATING ARTICLES
Filed Feb. 8, 1955
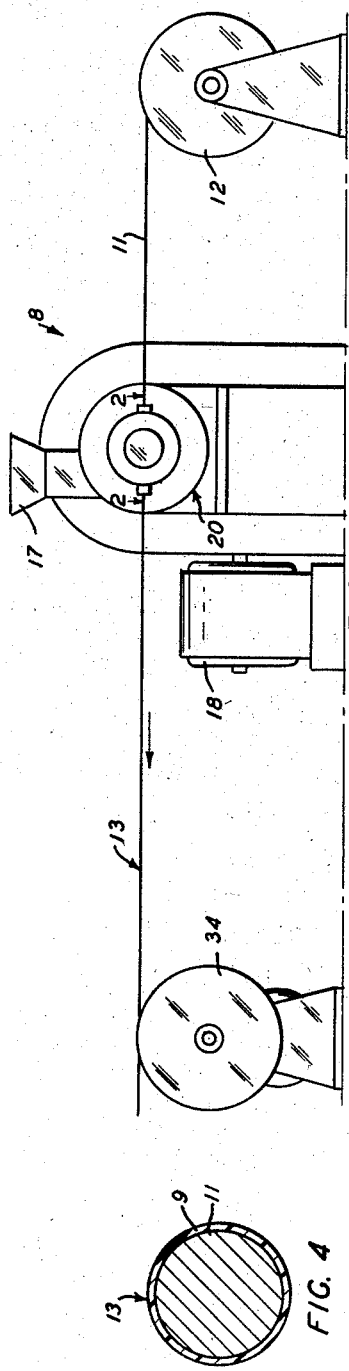
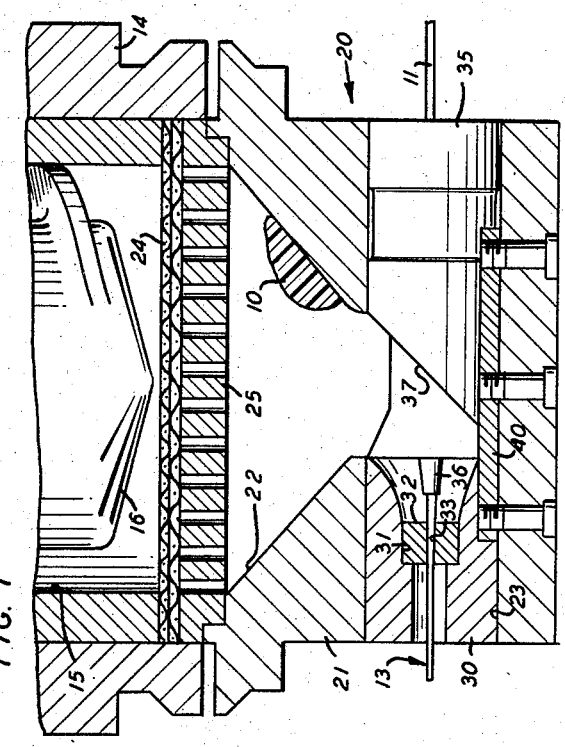
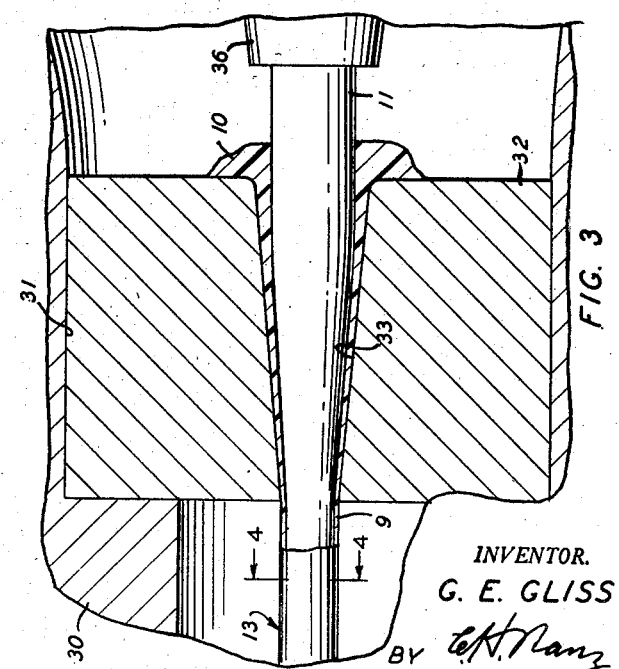
INVENTOR.
G. E. GLISS
BY
ATTORNEY

United States Patent Office 2,885,777
Patented May 12, 1959

2,885,777

METHODS OF AND APPARATUS FOR COATING ARTICLES

George E. Gliss, Towson, Md., assignor to Western Electric Company, Incorporated, New York, N.Y., a corporation of New York Application February 8, 1955, Serial No. 486,845

6 Claims. (Cl. 29—528)

This invention relates to methods of and apparatus for coating articles and more particularly to methods of and apparatus for applying thin-walled, organic plastic coverings upon ductile, filamentary articles.

In the manufacture of certain types of electrical conductors, it is desirable to apply an extremely thin-walled covering of a plastic insulating material, such as polyethylene or the like, on a ductile, filamentary conductive core, made of drawable material such as a copper wire or the like. The desired covering of plastic insulating material, which may have a thickness of the order of .0002 inch, must be uniform and wholly continuous to provide the required electrical characteristics of the finished product. Heretofore no satisfactory methods of and apparatus for applying such thin-walled coverings have been found.

It is an object of this invention to provide new and improved methods of and apparatus for applying thin-walled, organic plastic coverings upon filamentary articles.

A method illustrating certain features of the invention may include the steps of enveloping an advancing filamentary article with an organic plastic material in a highly extrudable condition and under high pressure, and simultaneously drawing the article and the enveloping plastic material to reduce the cross sectional profile of the filamentary article and to produce a very thin, uniform layer of the plastic material adhering thereto.

Apparatus illustrating certain features of the invention may include means for advancing a filamentary article continuously in the direction of its length, means for enveloping the advancing filamentary article in an organic plastic material in a highly extrudable condition and under a high pressure, and a die through which the filamentary article and the enveloping plastic material is forced. The die is provided with a constricting aperture of a size and shape such that the cross sectional profile of the filamentary article is reduced substantially and a very thin, uniform layer of the plastic material is produced thereon.

A complete understanding of the invention may be had from the following detailed description of methods and apparatus forming specific embodiments thereof, when read in conjunction with the appended drawings, in which:

Fig. 1 is a side elevation of apparatus forming one embodiment of the invention;

Fig. 2 is an enlarged, fragmentary, horizontal section taken along line 2—2 of Fig. 1;

Fig. 3 is an enlarged, fragmentary section showing a portion of the apparatus shown in Fig. 2, and Fig. 4 is an enlarged, vertical section taken along line 4—4 of Fig. 3.

Referring now in detail to the drawings, there is shown in Figs. 1 and 2 an extruder 8 for forming a very thin, imperforate layer 9 of a plastic compound 10 around a filamentary metallic conductor 11 withdrawn from a supply reel 12 to produce an insulated conductor 13. The extruder 8 includes an extrusion cylinder 14 provided with a longitudinally extending cylindrical bore 15 (Fig. 2) in which a stock screw 16 is rotatably mounted. The plastic compound 10 is introduced into the extrusion cylinder 14 from a hopper 17 which contains a supply of the plastic compound in the form of granules, pellets or the like. The stock screw 16 is driven rotatably by suitable drive means, such as an electric motor 18, to force the plastic compound 10 under high pressure to an extrusion head 20.

The extrusion head 20 includes a body member 21 having a tapered opening 22 which forms a continuation of the bore 15 and communicates with a bore 23 formed in the body member transversely of the tapered opening. A strainer 24 supported by a perforated backing plate 25 is positioned between the discharge end of the bore 15 and the tapered opening 22 for straining oversized particles and foreign matter from the plastic compound 10.

An annular die holder 30 is positioned in the exit end of the bore 23. A counterbore 31 is formed in the die holder and is designed to receive a die 32 which is made preferably of a material which is extremely wear resistant, such as a diamond or the like. The die 32 is provided with a central die orifice 33 which tapers generally frustoconically from right to left, as viewed in Fig. 2. The edge of the die orifice 33 at the right-hand face of the die 32, as viewed in Fig. 3, is rounded off slightly to form a bell-mouthed entrance thereto. Referring again to Fig. 2, it may be seen that the die orifice 33 tapers from a diameter at the entrance end thereof, which is substantially larger than the diameter of the undeformed conductor 11 as it enters the die orifice, to a diameter at the exit end thereof, which is substantially less than that of the undeformed conductor.

The conductor 11 from the supply reel 12 is advanced from right to left, as viewed in Fig. 1, by suitable conductor-advancing means, such as a capstan 34, through a core tube holder 35 and a core tube 36 which is held by the core tube holder. The core tube holder 35 is provided with an inclined surface 37 designed to deflect the flowing plastic compound 10 toward the die 32. An aligning plate 40 maintains the die holder 30 and the core tube holder 35, and thereby the die 32 and the core tube 36 centered relative to each other in the bore 23.

Operation

In the operation of the apparatus described hereinabove, the conductor 11 having a predetermined diameter is advanced continuously by the capstan 34 from right to left, as viewed in Fig. 1, through the core tube 36 and into and through the die orifice 33 in the die 32. The stock screw 16 is revolved continuously in the bore 15 by the electric motor 18. The plastic compound 10 is introduced into the extrusion cylinder 14 from the hopper 17, and is urged by the stock screw 16 toward the discharge end of the bore 15, through the strainer 24 and into the tapered opening 22 in the extrusion head 20.

As the plastic compound 10 is urged by the stock screw 16 along the bore 15, it is vigorously worked by the stock screw until it is in an easily extrudable state. The plastic compound 10 is foced through the tapered opening 22 and into the bore 23 where it envelops the conductor 11 completely as the conductor emerges from the exit end of the core tube 36 and advances toward the die orifice 33.

When the conductor 11 enters the tapered die orifice 33, it is completely enveloped in a substantially conical stream of the plastic compound 10. As the conductor 11 and the surrounding stream of plastic compound 10 advance through the die orifice 33, the constricting conical wall of the die subjects the conductor and the surrounding plastic compound to deformation forces which cause a substantial reduction to take place in the diameter of the conductor before it emerges from the die 32. The deformed conductor 11 emerging from the die 32 has a reduced diameter which is slightly less than the exit end diameter of the die orifice 33, and is covered by a very thin, imperforate layer 9 of the plastic compound 10.

It has been found that in accordance with this invention it is possible to extrude extremely thin, closely-adhering, uniform and continuous layers of plastic insulating compounds upon a central filamentary conductor. Manifestly, due to the reduction in the cross sectional profile of the conductor there is a substantial increase in its length.

In one specific example, a bare conductor made of hard copper wire having initially a .025 inch O.D. was advanced through an extruder substantially identical in design to the extruder 8. The extruder was provided with a diamond die having a die orifice which tapered uniformly to a minimum diameter of .023 inch. With this arrangement a .0002 inch imperforate layer of polyethylene was applied uniformly to the central conductor which had a finished diameter of slightly less than .023 inch. Insulation breakdown tests indicated that this very thin layer of polyethylene was substantially uniform and entirely free of pinholes or like defects.

It will be understood that the terms "organic plastic material" and "plastic compound," as used in the specification and appended claims, are meant to include organic plastic materials having molecular structures such that they may be extruded into extremely thin, continuous films.

What is claimed is:

1. The method of applying thin-walled, insulating coverings having a thickness of the order of .0002 inch to a filamentary copper wire, which comprises simultaneously extruding polyethylene under high pressure and in a highly extrudable condition upon an advancing filamentary copper wire, and drawing the copper wire and the enveloping polyethylene through a die having a constricting aperture of a size such that the cross sectional profile of the copper wire is reduced substantially and the reduced copper wire is covered with a uniform, surrounding layer of polyethylene having a thickness of the order of .0002 inch.

2. The method of applying a thin-walled organic plastic covering to a ductile, filamentary article of indefinite length in a single deforming operation, which comprises extruding an organic plastic material in a highly extrudable condition and under high pressure upon successive portions of an advancing ductile, filamentary article by passing each portion thereof through an extrusion die while simultaneously drawing the same portion of the filamentary article being enveloped in the plastic material with the same die to reduce the cross-sectional profile substantially, increase the length of the article substantially and produce thereover a thin, uniform layer of plastic material.

3. The method of applying a thin-walled, insulating covering of polyethylene to a ductile, metallic, filamentary core of indefinite length in a single deforming operation, which comprises extruding polyethylene in a highly extrudable condition and under high pressure upon successive portions of an advancing ductile, metallic, filamentary core by passing each portion thereof through an extrusion die while simultaneously drawing the same portion of the filamentary article being enveloped in the polyethylene with the same die to reduce the cross-sectional profile substantially, increase the length of the core substantially and produce thereover a thin, uniform layer of polyethylene.

4. Apparatus for extruding a thin-walled covering of an organic plastic material on a ductile, filamentary article of indefinite length in a single deforming operation, which comprises an extrusion head having a passageway extending therethrough, means for forcing an organic plastic material in a highly extrudable condition and under high pressure through the passageway, a single die positioned adjacent to the exit end of the passageway for enveloping a portion of the ductile, filamentary article in the plastic material being forced through the passageway and for simultaneously drawing the same portion of the ductile, filamentary article to reduce the cross-sectional profile thereof substantially and increase the length thereof substantially, and means for advancing successive portions of the ductile, filamentary article through the passageway and the die for simultaneously drawing and covering the same portion of the filamentary article at the same time with the same single die.

5. Apparatus for extruding a thin-walled covering of an organic plastic material on a ductile, filamentary article of indefinite length in a single deforming operation, which comprises an extrusion head having a passageway extending therethrough, means for forcing an organic plastic material in a highly extrudable condition and under high pressure through the passageway, a single, tapered die positioned adjacent to the exit end of the passageway and having a minimum orifice dimension a predetermined amount smaller than the outside dimension of the ductile, filamentary article prior to its passage therethrough for enveloping a portion of the ductile, filamentary article in the plastic material being forced through the passageway and for simultaneously drawing the same portion of the ductile, filamentary article to reduce the cross-sectional profile thereof substantially and increase the length thereof substantially, and means for advancing successive portions of the ductile, filamentary article through the passageway and the die for simultaneously drawing and covering the same portion of the filamentary article at the same time with the same single die.

6. Apparatus for extruding a thin-walled covering of an organic plastic material on a ductile, filamentary article of indefinite length in a single deforming operation, which comprises an extrusion head having a passageway extending therethrough, means for forcing an organic plastic material in a highly extrudable condition and under high pressure through the passageway, a single, diamond die positioned adjacent to the exit end of the passageway having a tapered orifice for enveloping a portion of the ductile, filamentary article in the plastic material being forced through the passageway and for simultaneously drawing the same portion of the ductile, filamentary article to reduce the cross-sectional profile thereof substantially and increase the length thereof substantially, and means for advancing successive portions of the ductile, filamentary article through the passageway and the die for drawing and covering the same portion of the filamentary article at the same time with the same single die.

References Cited in the file of this patent

UNITED STATES PATENTS

| | | |
|---|---|---|
| 867,659 | Hoopes | Oct. 8, 1907 |
| 1,248,107 | Hathaway | Nov. 27, 1917 |
| 1,712,348 | Howe | May 7, 1929 |
| 1,823,869 | Baur | Sept. 15, 1931 |
| 1,902,493 | Dantsizen | Mar. 21, 1933 |
| 1,963,298 | Elder | June 19, 1934 |
| 2,011,398 | Dimick | Aug. 13, 1935 |
| 2,286,759 | Patnode | June 16, 1942 |
| 2,308,638 | Balthis | Jan. 19, 1943 |
| 2,320,801 | Simons | June 1, 1943 |
| 2,326,629 | Evans | Aug. 10, 1943 |
| 2,380,722 | Brown | July 31, 1945 |
| 2,760,229 | Cheney | Aug. 28, 1956 |
| 2,766,479 | Henning | Oct. 16, 1956 |